US006591278B1

(12) United States Patent
Ernst

(10) Patent No.: US 6,591,278 B1
(45) Date of Patent: Jul. 8, 2003

(54) PROJECT DATA MANAGEMENT SYSTEM AND METHOD

(75) Inventor: Johnannes Ernst, Sunnyvale, CA (US)

(73) Assignee: R-Objects, Inc., Sunnyvale, CA (US)

( * ) Notice: Subject to any disclaimer, the term of this patent is extended or adjusted under 35 U.S.C. 154(b) by 0 days.

(21) Appl. No.: 09/519,016

(22) Filed: Mar. 3, 2000

(51) Int. Cl.[7] ............................................. G06F 17/30
(52) U.S. Cl. .......................... 707/104.1; 707/3; 707/4; 707/8; 707/10; 707/101; 709/223
(58) Field of Search .......................... 707/10, 8, 104.1, 707/3, 4, 101; 709/223

(56) References Cited

U.S. PATENT DOCUMENTS

| | | | | |
|---|---|---|---|---|
| 5,333,312 A | * | 7/1994 | Wang ............................. | 707/8 |
| 5,634,016 A | * | 5/1997 | Steadham, Jr. et al. ..... | 395/329 |
| 5,696,982 A | * | 12/1997 | Tanigawa et al. ........... | 395/790 |
| 5,812,130 A | * | 9/1998 | Van Huben et al. ........ | 345/339 |
| 6,298,378 B1 | * | 10/2001 | Angal et al. ................. | 709/223 |

FOREIGN PATENT DOCUMENTS

| | | | | |
|---|---|---|---|---|
| EP | 0 713 1777 A1 | * | 5/1996 | ............. G06F/9/46 |
| WO | 01/90884 A2 | * | 11/2001 | ............. G06F/9/01 |
| WO | 01/90886 A2 | * | 11/2001 | ............. G06F/9/00 |
| WO | 01/91033 A2 | * | 11/2001 | ............. G06F/9/00 |

* cited by examiner

Primary Examiner—Frantz Coby
(74) Attorney, Agent, or Firm—Timothy W. Lohse; Gray Cary, et al.

(57) ABSTRACT

A project data management system and method are provided wherein any user associated with a project may access any of the information relevant to the project regardless of the location of each user or the information and regardless of what tool was used to create the information. The system also permits user to interrelate information items from different locations or different tools. In a preferred embodiment, each user may use a typical web browser application to access the information. The system may check and maintain the integrity of the information and/or alert each user when there is an inconsistency in any of the information associated with the project. The system makes the access, integration and monitoring of information between a distributed project team manageable and reduces the manual effort and time spent accessing information, determining the relationship between different items of information, and avoiding inconsistencies between different pieces of information.

35 Claims, 9 Drawing Sheets

PROJECT DATA MANAGEMENT SYSTEM AND METHOD

BACKGROUND OF THE INVENTION

This invention relates generally to a system and method for managing the data associated with any type of design project and in particular to a system and method for managing the data associated with a design project wherein the data is only accessible using different tools and the data is distributed.

The complexity of products and other projects (including hardware, software, mechanical and other technologies) under development today continues to increase with no end in sight. The increasing complexity of projects has significant ramifications on how these next-generation projects are built ranging from the types of technologies used during the development (e.g., the use of software to replace purely manual development processes) to the organizational structure used for the development project (e.g., the increased use of out-sourcing, concurrent engineering and distributed engineering). To better understand this problem, an example of an engineering project and product development will be used for illustration purposes. However, it should be understood that the problem and the solution to the problem in accordance with the invention may be equally applicable to other projects unrelated to engineering, such as financial project and supply chain projects.

For example, these next-generation products are increasingly being developed by engineering teams working concurrently wherein the engineering teams are often distributed between different locations and organizations. This new product development methodology takes advantage of many different specialized software tools and sometimes of automatic generation approaches. In many cases, the project may reuse pre-built library components. Thus, these new products typically require the combined efforts of engineers from several different engineering disciplines to work concurrently on the design of a product. For example, the development of an automobile powertrain requires engineers of different disciplines to work together and share information since the powertrain includes mechanical, hydraulic, electronic and software components that must be integrated together.

This cooperation of the distributed engineering teams requires the sharing and coordination of the flow of information between all of the project participants. The sharing and coordination of the information becomes critical to the success of the project. At the same time, engineering managers are tasked with reducing costs and time to market while increasing product quality. Other factors, such as new technologies and more demanding time to market periods, put a strain on the timely and effective information flow between the distributed engineering teams associated with a particular project.

Unfortunately, there is little ready-to-use software available to assist engineering managers in setting up an infrastructure to facilitate the concurrent, integrated engineering of complex products by distributed engineering teams. Although many different engineering tools exist today, these tools are typically focused on solving one particular engineering problem. In addition, these different engineering tools are typically not compatible with each other so that it is difficult to share information between the different tools. Thus, an engineer may find it difficult to visualize the whole picture since there is no single tool for viewing the information generated by all of the various different tools. For example, there are some excellent software tools for electronic design that are often indispensable for the design of a product's electronic components, but they obviously cannot be used to develop the product's software or mechanical components. The electronic design tools cannot be used to analyze the product as a whole since the product's function and behavior are determined by the functions and behaviors of all of the components of the product together not just those components developed using the electronic design tool. The same problem exists for the tools in the other engineering domains, such as control design tools, systems analysis and design tools, software analysis and design tools, CAD, CAE and the like. The desire to resolve this problem of non-integrated engineering software islands that cannot share information has always been a fondest wish and need of both engineering managers as well as individual engineers that build products. The problem is that no one knew how to accomplish the goal. In fact, the desirability of such an integrated solution becomes increasingly more desirable and important as the complexity of the products continues to increase. Thus, while the time-to-market windows continue to shrink, the communication and collaboration between engineers and engineering teams is still typically performed as it always has been, i.e., either by getting together in person around a white board or by traditional means of communication such as telephones.

As a result of still sharing the information in this typical manner, engineers in many types of projects spend about 30% of their working time in meetings or on the phone exchanging information and talking about in-process development information, such as models, test cases, parameters and the like. In some particularly complex situations, the time spent in meeting and on conference calls is as high as 90% of their working time. In general, the time spent on collaboration increases directly with the complexity of the project reflecting the need to work with an increasing number of engineering experts in different fields for more complex projects. The problem with typical collaboration methods is that they tend to be error-prone, inefficient, temporary, expensive and very risky. For example, if a critical parameter is used by multiple engineers and this parameter is changed without all of the affected engineers being advised, some of the engineers will continue their concurrent development based on incorrect information. This obviously can lead to disastrous consequences. Typically, most engineers have experienced this problem that may cause product development delays, higher product development costs, lost market windows or, at worst, a product recall.

Thus, it is desirable to provide a project data management system that overcomes the above limitations and problems with typical project development tools and it is to this end that the present invention is directed.

SUMMARY OF THE INVENTION

The project data management system and method in accordance with the invention overcomes the above limitations and problems caused by the prevalence of "information islands" in product development, each created with a typical product development tool. In particular, the system permits access, integration and analysis of the information created in one or more different engineering tools even when the tools are manufactured by different vendors, focus on different engineering disciplines, and are distributed over a local-area or wide-area network such as the internet. Thus, the system encourages and facilitates the sharing of information between the engineers to facilitate the concurrent development of a product using distributed engineering teams. The system also permits any engineer to access the project information regardless of the particular software tools being used by the engineer. In accordance with a preferred embodiment of the invention, the system may use a computer network, such as the World Wide Web, the Internet, a wide area network or a local area network, to communicate the information between the distributed engineering teams. As information in any portion of the project is changed, deleted or added, the updated information is fed to each instance of the information in the system so that any change by any engineer is reflected throughout the system. For example, if an engineer changes a critical parameter, that change is distributed to every other engineer so that, if any other engineer reviews that parameter at any time after the change has been made, the engineer will be presented with the updated parameter or notified of the change. Thus, the problem of using outdated information due a breakdown in information communication is eliminated.

In more detail, the system may include one or more databases that contain all or part of the project information. When any person involved with the project requests a particular piece of information, that information is obtained through an adaptor from its native source, may be replicated by the system and is provided to the person along with an viewer that may permit the person to view that information. The viewer might also support the editing of the information. Thus, each person accessing the information only has a copy of the information which ensures that the integrity of the data is maintained. If any person makes an change to any piece of information in the project, that change is updated to every other person currently viewing that information so that the information is updated in real-time. The system may also include a locking mechanism to ensure that only one person may make a change to a particular piece of information at any time which maintain the integrity of the information.

For a user using a client, which may be a stand-alone personal computer or a software process running on a shared computer, the system presents the user with an easy to use user interface. In particular, the system uses the well-known typical browser interface and presents either web pages or Java applets to the user in order to present information to the user. For example, a web page or a Java applet may be used to display a meta-object to the user and may be used to permit the user to establish a hot-link between two meta-objects.

Thus, in accordance with the invention, a project data management system is provided, comprising an integration server for storing one or more master meta-objects and one or more slave meta-objects, the master meta-objects being originated at the integration server and the slave meta-objects being originated at a remote site, and a client computer for accessing the master and slave meta-objects stored on the integration server. The system further comprises one or more enablers in the integration server, each enabler associated with each tool that is used to generate information stored in the integration server and permitting the information to be accesssed by a user without accessing the particular tool. The system further comprises one or more differencers in the integration server for comparing the values of the meta-objects being accessed by the user at predetermined time periods in order to determine if the particular meta-object has been changed and for updating the values associated with the meta-object when a change has occurred.

In accordance with another aspect of the invention, a project data management system is provided, comprising a first integration server that stores one or more master meta-objects relating to data associated with the project wherein the master meta-objects are generated by one or more different tools and one or more second integration servers connected to the first integration server, the other integration servers storing one or more master meta-objects and one or more slave meta-objects wherein the master meta-objects are generated by users connected to the second integration servers and the slave meta-objects are generated by a user connected to the first integration server. The first and second integration servers further receives a user request to access a meta-object not located on the server, requests a replicated meta-object from the server that stores the master meta-object and receives a replicated meta-object so that the user may access the meta-object.

In accordance with yet another aspect of the invention, a project data management method is provided, comprising storing one or more master meta-objects relating to data associated with the project on a first integration server wherein the master meta-objects are generated by one or more different tools. The method further comprises connecting one or more second integration servers to the first integration server, the other integration servers storing one or more master meta-objects and one or more slave meta-objects wherein the master meta-objects are generated by users connected to the second integration servers and the slave meta-objects are generated by a user connected to the first integration server. The method further comprises receiving a user request to access a meta-object not located on the server, requesting a replicated meta-object from the server that stores the master meta-object, and receiving a replicated meta-object so that the user may access the meta-object.

In accordance another aspect of the invention, a method for updating a meta-entity stored in a distributed project data management system having one or more integration servers is provided. The method comprises receiving a request to update a meta-object for a particular integration server wherein the meta-objects includes a master meta-object, each master meta-object having one or more associated slave meta-objects, and determining that the master lock is located at the master meta-object. The method further comprises updating the master meta-object, and propagating the updates to the master meta-object to the slave meta-objects associated with the master meta-object.

DETAILED DESCRIPTION OF A PREFERRED EMBODIMENT

Figure 1:
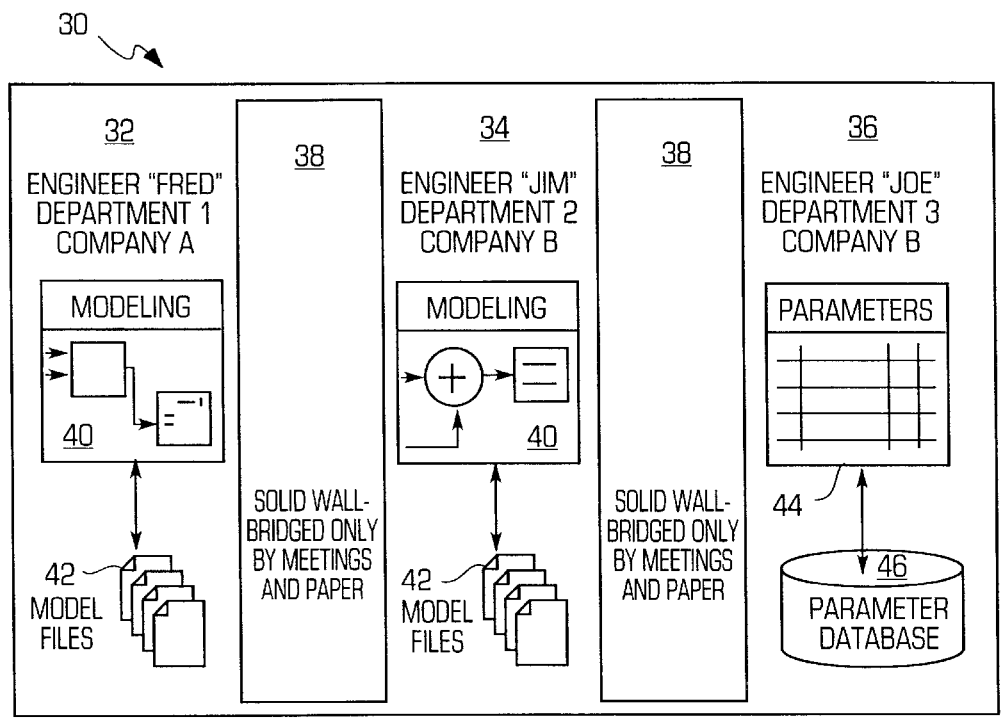
FIG. 1 is a diagram illustrating a typical project.

The invention is particularly applicable to, but not limited to, a project data management system for engineering and it is in this context that the invention will be described. In particular, an example of the system will be described with reference to an enginnering project and management of the data involved in the engineering project. It will be appreciated, however, that the system and method in accordance with the invention has greater utility, such as to any type of projects with large amounts of inter-related data, such as financial projects, supply chain projects, etc. in which project data is distributed and created and updated by several software products. Prior to describing the project data management system in accordance with the invention, a typical project development and the typical tools used for the development are described so that the project management system in accordance with the invention will be better understood.

Typical Project Management

The prevalent software tools used today have typically been designed by their vendors to address a specific discipline or problem set. For example, in engineering there may be computer aided design (CAD) and computer aided engineering (CAE) tools, project management tools, control design tools, simulation tools, meta-object analysis tools and design tools and the like. In general, these tools are quite helpful and often indispensable for a particular type of engineering domain or for a particular group of engineers handling a particular part of the project. However, from the perspective of people outside of that specific work group, the models and information generated by that work group are only available using the particular tools which means that only the people in that work group are able to access the information. When someone outside of that group needs the information from the work group, it is necessary to set up a meeting with a member of the work group to discuss the information or to request a print-out of the information. This typical information sharing process is inefficient and time-consuming for the person who needs the information as well as the people in the work group since they may be pulled into meetings to explain the same issue and information to many different people.

The direct access of the information from the particular work group is not a feasible option since these tools do not often have the ability to share information across organizational and disciplinary boundaries. In addition, the tools are not integrated with other tools so that a person outside the work group could not understand the context of the information in the tool. At most, the tools may enable a flat file of data to be generated which does not provide the receiver of the file with any contextual information. In addition, even if the person has the tool to open the file with the information, the person is typically not an expert with the particular tool nor with the content of the file so that the usefulness of access to the file is reduced. Now, an example of a typical software engineering management project will be described to illustrate the problems and limitations with the typical approach.

FIG. 1 is a diagram illustrating an example of a typical engineering project 30. In particular, the project may involve an engineer ("Fred") at a first company (Company A) 32, a second engineer ("Jim") at a second company B 34 and a third engineer ("Joe") at another department of the same company B 36 wherein the different engineers are separated from each other by information walls 38 that are bridged only by typical meetings or paper. In this example, Fred and Jim are both using a modeling design tool 40, which may or may not be the same product from the same vendor, but each is generating and accessing his own model files 42 that cannot be easily shared. Thus, both engineers design parts of the same product and store their respective models in files on their local workstations. Since both models include and depend upon, for example, engineer parameters, both Fred and Jim must contact Joe, a lab engineer located in a different location of Jim's company. At Joe's location, there may be list of parameters 44 that may be stored in a proprietary database application 46 (such as an Oracle database application) that manages the parameters, such as the parameters obtained from lab tests or from the measurement track.

Traditionally, when Fred discovers that his model depends on parameters stored in Joe's database Fred must ask Joe to have a meeting or telephone conference so that Fred can asks questions (e.g., "What the value of parameter A?") and Joe can provide answers (e.g., "A is 5.9") after consulting the database or provide a printout from the database. The setting up and conducting of the meeting is a laborious task for Fred since it may involve time-consuming travel or may require Fred to determine the engineer who can answers his questions if he does not know that Joe is the appropriate person. The worst part is that the above time-consuming process may be completely duplicated when Jim discovers that he also needs information about the same parameter.

The above problem with traditional information sharing becomes exacerbated when someone, such as an engineer in Joe's engineering group, needs to change the value of a parameter when the value of that parameter was given to both Jim and Fred earlier. Typically, Joe may change the parameter value in a parameter management application, but it then is left to pure chance whether the Fred or Jim will ever know that the parameter value has changed. The above example is obviously much less complex than typical product development processes, but it still illustrates the problems and limitations with typical product development system and processes. Another way of illustrating the problems will now be described.

Figure 2:
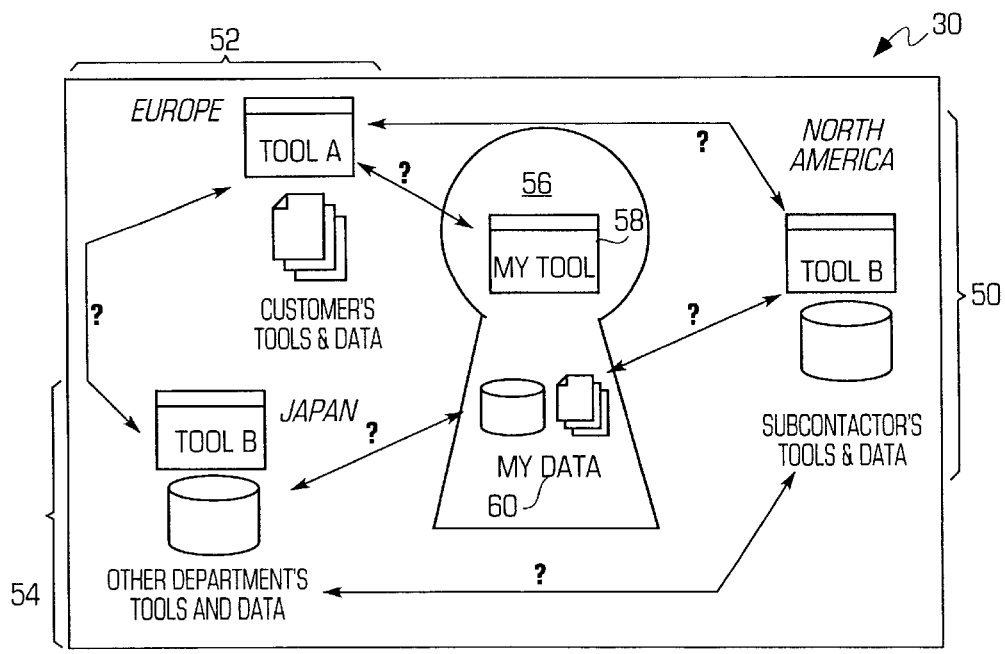
FIG. 2 is a diagram illustrating the view of a engineer during work on a typical project.

FIG. 2 is a diagram illustrating the view of a engineer during work on a software project 30 wherein the project may include a North American team 50, a European team 52, a Japanese team 54 and a particular engineer's portion of the project 56. As shown, each different team may be using different tools and generating data unique to that team and the engineer 56 is in the dark about the tools being used or the data being generated by the other teams due to the lack of information communication and collaboration. This is shown in the figure where the engineer 56 is looking through a small keyhole at only his tools 58 and data 60 and does not know of the relationships that his data or tool may have with the other teams. As described above, this leads, for example, to the engineer 56 not knowing that a parameter that he relies on in his tool has been changed. Therefore, the engineer may expend a great amount of energy calculating a piece of data based on a bad parameter value and is forced to redo the entire calculation. Now, a simplified typical software engineering project will be described.

Figure 3:
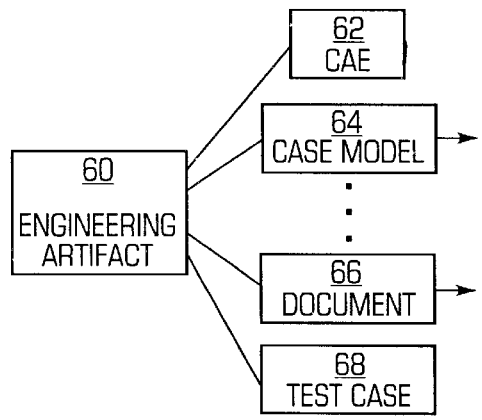
FIG. 3 is a diagram illustrating a typical engineering project.

FIG. 3 is a diagram illustrating a typical engineering project 30 wherein an engineering artifact 60 may have an association with another data element that is part of the project so that a change to that data element needs to be communicated and incorporated into the other data elements to ensure an accurate project development. In this example shown, the data in the artifact may affect the data for the computer aided engineering (CAE) team 62, the data for a case model 64, the data for a document 66 and the data for a test case 68. Thus, any changes in the data associated with the engineering artifact 60 needs to be disseminated to the entire project team in order to prevent the problem of erroneous data being present within the project data. This problem as well as other problems and limitations inherent in the traditional project development process may be solved by the project data management system and method in accordance with the invention as will now be described.

The Project Management System In Accordance With The Invention

Figure 4:
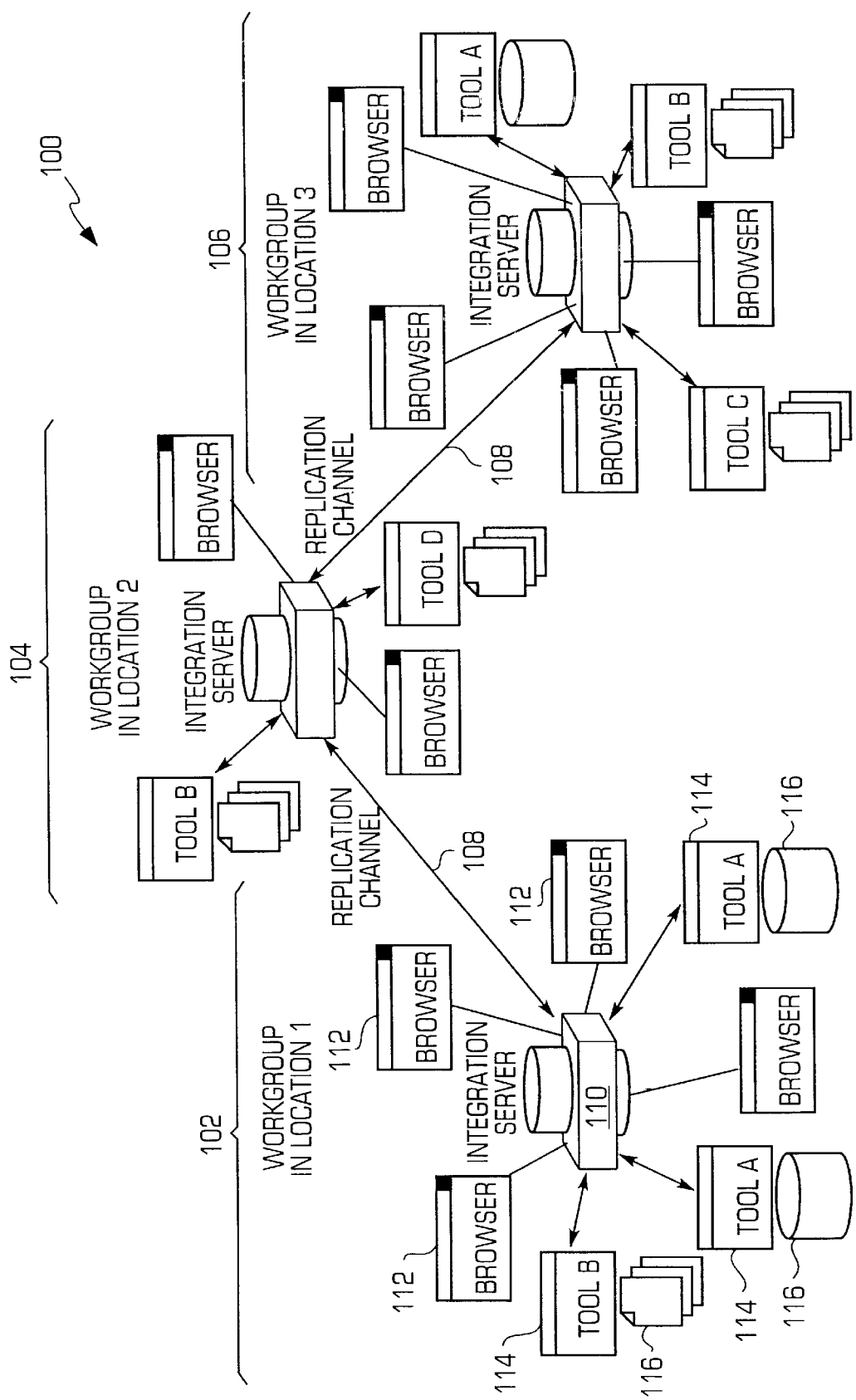
FIG. 4 is a diagram illustrating a preferred embodiment of a project data management system in accordance with the invention.

FIG. 4 is a diagram illustrating an example of a preferred embodiment of a project data management system 100 in accordance with the invention. In this example, the management system 100 may be utilized by a distributed engineering team that may include a first workgroup 102, a second workgroup 104 and a third workgroup 106 being connected together by a computer network 108, such as the Web, the Internet, a local area network or a wide area network. The computer network may be used to carry a replication channel for meta-objects as described below in more detail. In accordance with the invention, the management system may include a plurality of different workgroups in a plurality of different locations that are linked together by a computer network. In a preferred embodiment, the protocol used to communicate the data over the computer network may be CORBA™ (Object Management Group), but it may also be any other protocol that permits the replication of data as described below. The components within a workgroup will now be described although it is understood that each workgroup may have similar components.

The workgroup 102 may include an integration server 110 in accordance with the invention, one or more browsers 112, and one or more tools 114 and their associated data 116 stored in, for examples, files or databases. In one embodiment, the integration server 110 may generate web pages that are displayed to each user that accesses project management data using a typical web browser software application 112. In another embodiment, the integration server 110 may generate Java applets that are downloaded from a web site, such as www.aviatis.com, wherein that website is the "portal" where the user "starts" to access the data in his local enterprise through one or more integration servers. In accordance with the invention, the data being generated by the integration server 110 may also be any other client application in any other implementation technology.

Each browser 112 may be executed by a computer that then connects to the integration server. Each browser may also be referred to as a client wherein the client may be executed by a stand-alone personal computer or may be executed on a shared computer. The web pages (Java applets in another embodiment) generated by the integration server, as described below with reference to FIGS. 14–19, may display menus and other user interface information to the user or may display the data requested by the user. The integration server 110 may also interact with each tool 114 and its data 116 so that the data 116 associated with a particular tool may be shared by the other members of the product development team in accordance with the invention even without the particular tool being accessible or available to all project participants. The integration server 110 may also provide adapters as described below, that permits that data generated by a tool to be viewed by any other person involved with the project whether or not the person has access to the particular tool. Thus, the integration tool permits any user to be able to access any of the data generated by any of the tools involved in the project.

Figure 5:
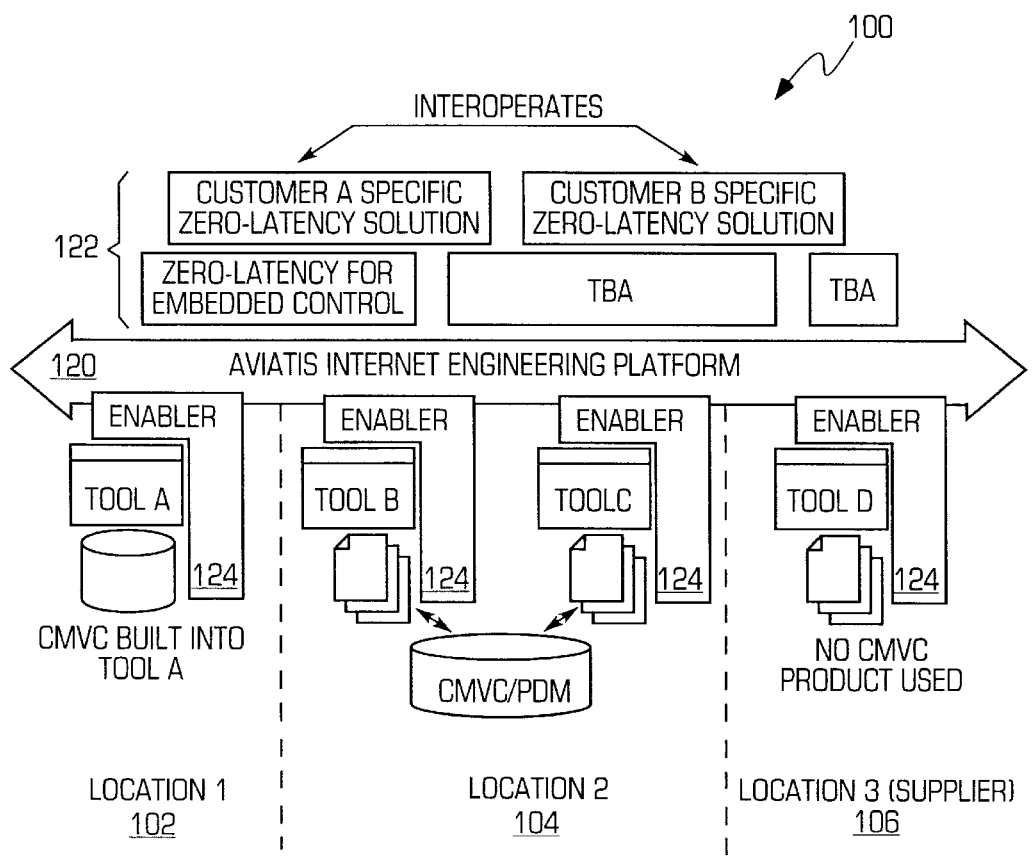
FIG. 5 is a diagram illustrating more details of the preferred embodiment of a project data management system in accordance with the invention.

FIG. 5 is a diagram illustrating more details of the preferred embodiment of a project data management system 100 in accordance with the invention. The three different workgroups 102, 104 and 106 at three different locations are shown. In this figure, the first and second workgroups 102, 104 may be internal workgroups while the third workgroup 106 may be a parts supplier to the project. Thus, the system 100 permits the easy sharing of information and the collaboration with outside suppliers. In this diagram, the interconnection of the workgroups that is provided by the integration servers is shown as an Internet Engineering Platform 120. The platform 120, that may be implemented using the integration servers described above, may permit the interoperation, for example, of two or more different organizations that are all involved with the project development. It may also permit a number of individual zero-latency solutions to be integrated together to form an overall zero-latency solution. The system in accordance with the invention may be referred to a zero-latency since the amount of lag time (latency) between changes in information and updating of that information across the project is minimized or eliminated.

As shown, the platform 120 may include one or more enablers (also known as adapters) 124 that permit the data from a particular tool (Tool A, Tool B, Tool C or Tool D) to be shared with the other persons associated with the project without each person needing to have access to the particular tool and without each person needing to be an expert at using the particular tool. Thus, the platform 120 permits the data generated by one or more different incompatible tools to be shared between a plurality of different users. In the example shown in FIG. 5, Tool A may have a version and configuration management component (CMVC) while Tool D used by the supplier may not have a CMVC component. In a typical system, it would therefore be difficult for the supplier to look at the data generated by Tool A due to the differences in the tools. In accordance with the invention, however, the supplier is easily able to review the data generated by Tool A and also be alerted when there is a change in the data associated with Tool A. Now, the project data management system in accordance with the invention will be described in more detail by illustrating an engineering project incorporating the project data management system in accordance with the invention.

Figure 6:
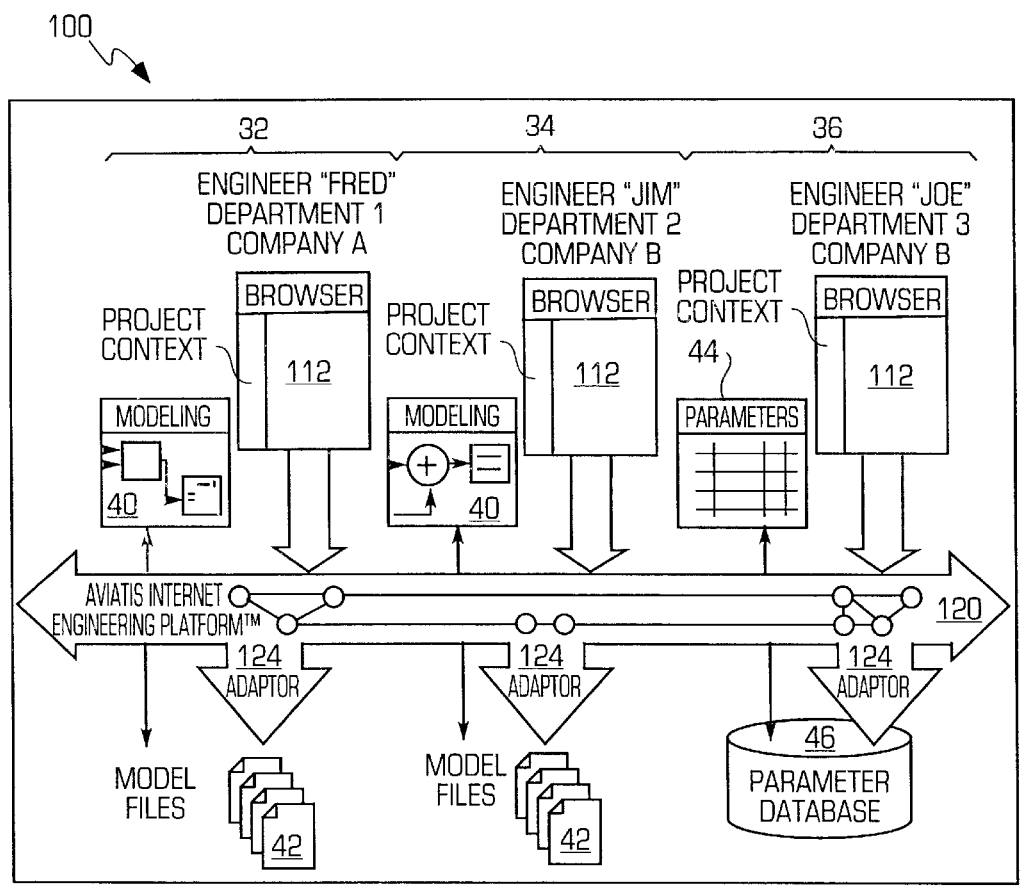
FIG. 6 is a diagram illustrating an example of the project data management system in accordance with the invention being used for a project.

FIG. 6 is a diagram illustrating more details of the project data management system 100 in accordance with the invention incorporated into the product development project so that the product development is more collaborative and information is shared between the engineering groups without the need for a meeting or a telephone conference. In addition, the system also ensures that any changes in any of the data in the project is propagated to all other persons associated with the project. As with the project shown in FIG. 1, there are three engineering groups including engineer Fred at Company A 32, engineer Jim at Company B 34 and engineer Joe at a different department of Company B 36. As shown, the information barriers 38 of FIG. 1 are no longer present since the project data management system 100 eliminates the problems and limitations associated with traditional projects.

As with FIG. 1, Fred and Jim both use modeling tool 40 that generates model files 42 while Joe has a parameter list 44 that may be stored in a database 46. In accordance with the invention, the data in the parameter database and the data generated by the modeling tools may be shared between Joe, Fred and Jim without requiring a meeting and without requiring that each of the engineers is an expert with all of the tools. The project data management system 100 may include a typical browser software application 112, such as Netscape® Navigator, that permits the engineers to access the Internet engineering platform 120 and thus the data and tools associated with the project using a familiar user interface of the browser. The system 100 may also include the adapters 124 that permits the data associated with each tool or database to be accessed by another user without having the associated tool.

For example, if Fred needs to review the value of parameter A, he may make a request through the platform 120 (that may be implemented using the integration servers described above). The integration server may access the parameter database 46, replicate the meta-object containing the value of parameter A and return the replicated meta-object containing the value of parameter A to Fred on a web page being displayed using his browser. While Fred is accessing the meta-object with the value of parameter A, if the value of parameter A changes, then Fred's replicated meta-object is also updated so that Fred will view the new value for parameter A. If Fred wants to change his replicated copy of the meta-object (known as a slave), the system may permit the change of a slave meta-object as described below with reference to FIGS. 11 and 12.

Thus, the project data management system provides a new way to access and maintain the consistency of engineering data regardless of where it is physically located or what tool was used to create the data. Therefore, the traditional situation of isolated engineering (See FIG. 1 and FIG. 2) is eliminated. For example, the system in accordance with the invention may be used to integrate SGML and XML data including the SGML/XML file format and all of the APIs associated with SGML and XML, such as SAX. As shown, the data exchange boundaries, which without the management system require a meeting or exchange of paper to overcome, may be overcome with the replication of meta-objects and presentation of the replicated meta-objects using a user interface such as a typical web browser software application. The platform provides the communications links that permits any user associated with a particular project to access any engineering information regardless of the location of the information or the location of the user. In more detail, in a preferred embodiment, the system provides a common interface so that any authorized user with a web browser may now access the engineering information. The system also eliminates the typical problem that a user that desires to access information must be knowledgeable about the particular tool that created the data since the system provides adapters.

In accordance with the invention, the system aggregates and interrelates the engineering information (e.g., models, parameters, test cases, algorithms, etc) that has been generated during the project using the adapters. The system also interprets the contents of the data. For example, when a control design model is being accessed using the system, the user may select a control block in the diagram (as shown below when an example of the operation of the system is described) and apply context-specific operations on it such as examining its parameters just like a user may do with the tool that created the model.

In accordance with the invention, the project data management system is transparent and hidden from the user in that the user interacts with the system through the web browser and the data being generated by the system is placed into a typical web page so that the user feels like he/she is interacting with a typical web page. In accordance with a preferred embodiment of the invention, the typical web browser may run a JAVA applet that is dynamically downloaded from the management system so that there is no client-side installation required beyond the existence of a Java virtual machine on the client which is typically available with a browser software application. The management system may use HTTP, CORBA™ (Object Management Group) and XML and others as the underlying communication structures by which the applet in the browser communicates with the integration servers, the tool adapters and other applets. The system may also support protocols, such as SGML or XML, for direct communication between the integration server and the browser (wherein the browser may have direct XML support).

In accordance with the invention, it is important to note that the program data management system does not replace any of the typical engineering tools or software. Instead, the management system enables the content created by currently existing and future software tools to be used, collaboratively, by everyone on a project regardless of location. The primary user interface to any tool when the project data is being generated or changed may continue to be the tool's graphical user interface whereas a user may use the management system to access the data that other people or teams are working on and to understand how the data relates to the data from the other teams or engineers. In the above example, Joe may use his typical software tools and the parameter database's user interface to manage his parameters and may then use the system to find out who in the project depends on his parameters. Now, more details of the integration server in accordance with the invention will be described.

Figure 7A:
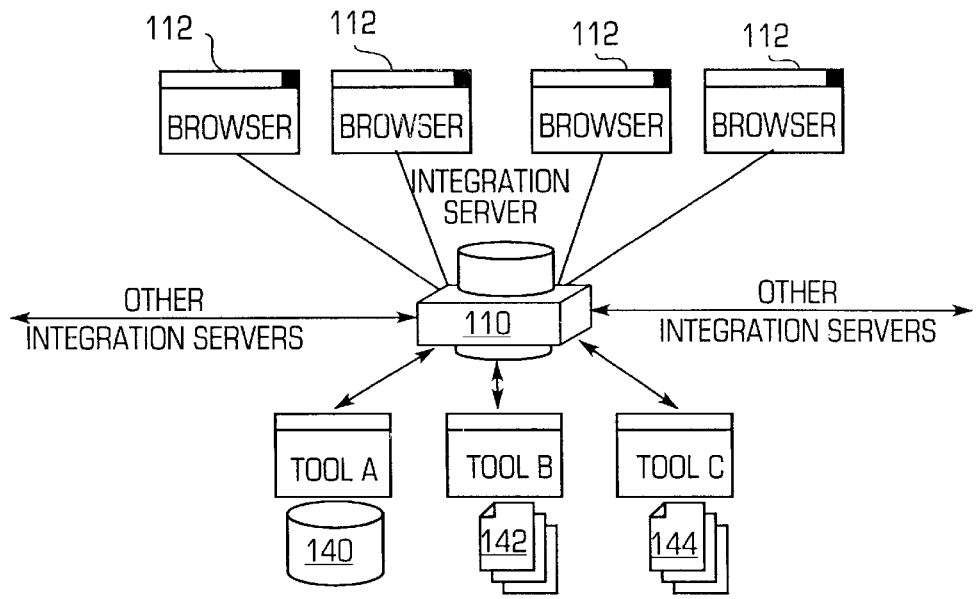
FIGS. 7a and 7b are diagrams illustrating an integration server in accordance with the invention that is part of the project data management system.
Figure 7B:
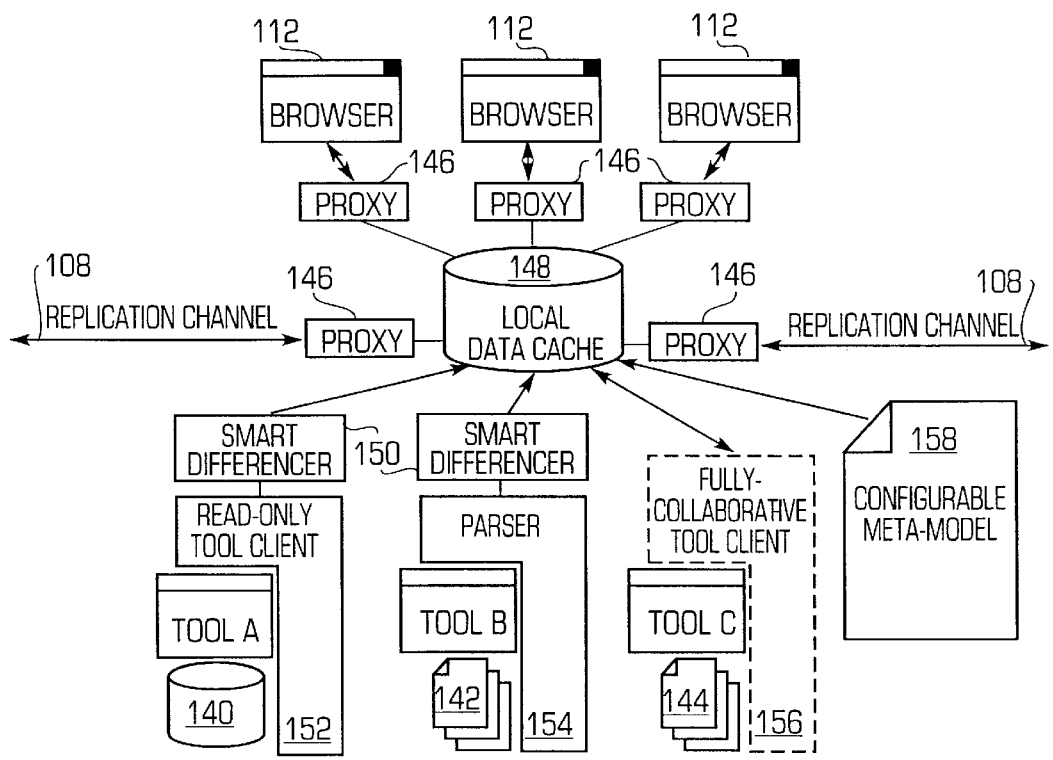

FIGS. 7a and 7b are diagrams illustrating the integration server 110 in accordance with the invention that is part of the project data management system 100. As described above, the project data management system may include one or more integration servers 110 linked together by a communications link wherein each integration server 110 may permit access to data from the project by the users assigned to that integration server. For example, there may be an integration server 110 at each different physical location of project participants so that the communications links may be used only for 1) communicating data not yet replicated to the integration server (newly accessed data); or 2) communicating updates to data not located on the particular integration server. As shown, authorized users may access the functionality of the integration server using a typical web browser application 112 in order to view the data associated with one or more tools that are associated with the project. In this example, there may be Tool A, Tool B and Tool C wherein Tool A may generate data stored in a proprietary database 140, Tool B may generate files 142 and Tool C may also generate files 144. In accordance with the invention, each user using a browser 112 may access any of the data associated with any of the tools using the project data management system embodied in the integration server 110.

As shown in FIG. 7B, the integration server 110 may be connected by the replication channels 108 as described above to other integration servers, for example, at different locations, to permit the collaborative sharing of project data and information. There may also be a proxy client 146 that is the "point of entry" of a communication channel between a "local data cache" and any other information source/sink. The proxy client 146 helps the user access the data, but also is helpful during delayed updates (e.g., "server X is down") and from a perspective of security.

The local data cache 148 may store and control access to the data local to the integration server (e.g., the master data generated by the tools (Tool A, Tool B and Tool C) connected to the particular integration server) and may store and control access to the data and information that is stored on other integration servers (e.g., the slave data). In the case of the slave data, the local data cache stores a replication of the master data. In accordance with the invention, the data may be located using a URL that may be used by the browser 112. In particular, each meta-entity instance may be identified by a URL.

The local data cache may also control the updating of the master data and the slave data as described below. This automatic updating of the master and slave data by the integration server ensures that any updates to the project data is automatically communicated to each other user that may be using that data. Thus, the problem of an engineer using the outdated value for a piece of data is eliminated due to the automatic updating. In addition, since only one person (the person with the master copy of the data) can change any particular piece of data at any point in time, the integrity of the data is maintained. In addition, as described in more detail below, a slave meta-object may become a master meta-object at any time to create the illusion of concurrent access and permit the user with the "old" slave meta-object (now a master meta-object) to update the meta-object provided that the user has the necessary permissions to accomplish the update.

The integration server 110 may also include a smart differencer tool 150 that permits the integration server 110 and the project data management system 100 to interact with the different project tools and the different data formats of the tools. In accordance with the invention, the smart differencer tools 150 may be applied to interface with any tool and any new tools so that the project data management system is compatible with any current or future tool and any data format. In some cases, a smart differencer tool 150 is not required. In fact, the smart differencer may be generic, i.e. not tool-dependent, and it may compare the content of the data source as of a certain time ("right now") with the content of the data source as it was when we looked at it last time, such as a minute ago. The smart differencer may then forwards any and all changes between the two versions to all other project participants that are accessing that meta-object so that everyone on the project has updates to the data as it occurs.

To access each of the tools and the associated data, the integration server 110 may include different client software applications that may also interface with the particular tool, such as a read-only tool enabler 152, a parser-based tool enabler 154 and a fully-collaborative tool enabler 156 shown in FIG. 7b. The integration server 110 may also include other interface tools and other interface tools or client applications may be developed for other existing tools or for new tools. Thus, the integration server 110 is expandable and extendable to work with newly developed tools and data. The local data cache 148 may also store a configurable meta-model that permits the information model of the integration server 110 to be changed, reconfigured or extended. Now, a method for meta-object replication in accordance with the invention will be described.

Figure 8A:
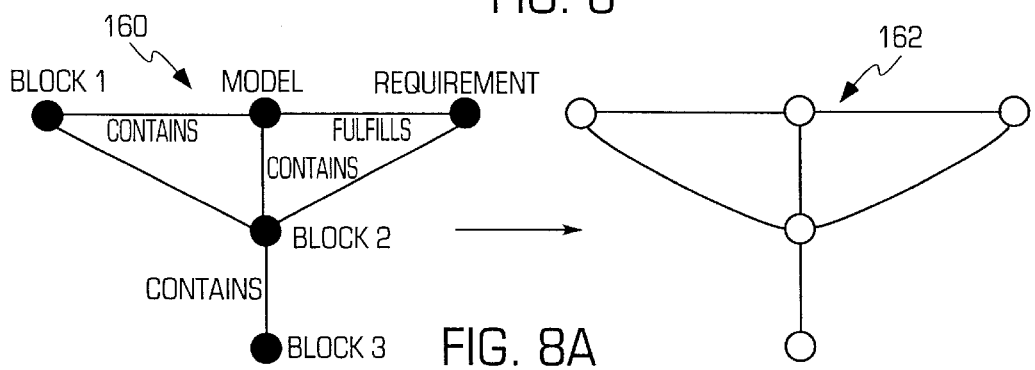
FIGS. 8a and 8b are diagrams illustrating meta-object replication in accordance with the invention.
Figure 8B:
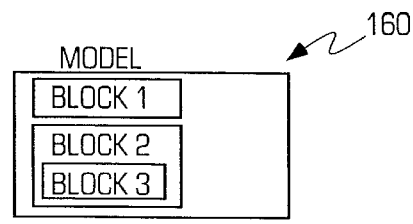

FIGS. 8a and 8b are diagrams illustrating meta-object replication in accordance with the invention. FIG. 8b shows a simple engineering diagram as one may be managed by an embodiment of the invention. The left hand side of FIG. 8a shows the representation of the engineering diagram as a set of meta-objects (shown as circles) and meta-relationship instances (shown as lines). In particular the meta-object representing the model 160 is shown. The meta-model may be, but is not limited to, one or more information models described using an entity-relationship modeling technique or an SGML or XML document type definition (DTD) or both (e.g., hybrid) or anything else that may describe an information structure.

In a typical system, when a user requests the value of an meta-object, the system may return the meta-object's properties, including the meta-object's value, to the user. Thus, each time that the user requests an meta-object, the system may query an integration server for the properties of the meta-object and return the properties to the user which increases the amount of traffic between the various elements in the typical system. In accordance with the invention, instead of returning the properties of the meta-object to the user directly or to the user interface, which then will render it appropriately to the user, the project data management system (and in particular the integration servers) may replicate the meta-object network associated with the meta-object and communicate that to the user so that the user now has a local slave copy of the meta-object network. That local slave copy may also be accessed by the other users connected to the same integration server. The advantage of the slave copy of the meta-object model is that, once the initial meta-object model is replicated and forwarded to the local data cache in the particular integration server, the communications between the integration server storing the master copy of the meta-object and the integration server storing the slave copy is minimized. The primary communication between the two after the initial replication is to update the meta-objects when changes to the meta-objects occur. In addition, the system also provides increased redundancy so that, if an integration server is down, the user may still be able to access the information.

Returning to FIG. 8a, the meta-object representing the model in FIG. 8b 160 may participate in a semantic containment relationship with one or more meta-objects wherein the meta-objects (represented as circles) are connected by meta-relationship instances (represented by the lines connecting the circles). For illustration throughout this application, a master meta-object is illustrated as a filled in circle while a slave meta-object is shown as a circle. In the example shown in FIG. 8, there may be a model meta-object, a requirement meta-object, a block1 meta-object, a block2 meta-object and a block3 meta-object. This model is illustrated in FIG. 8b wherein the model is an electrical circuit that may include block1, block2 and block3. The relationships between the blocks in the model are shown in the meta-object model 160 as the relationship links wherein, for example, the model meta-object and the requirement meta-object are connected by the relationship link indicating fulfills (e.g., the model fulfills the requirement), the model meta-object and the block1 meta-object are connected by the "contains" relationship link indicating that the model contains block1 (See FIG. 8b), and model contains block2 and block2 contains block3 as shown in FIG. 8b. In accordance with the invention, when a user requests data about one or more of the meta-objects shown, part or all of the meta-object network shown on the left hand side of FIG. 8a may be replicated to form a set of fully or partially interrelated slave meta-objects and meta-relationship instances 162 that has consistent meta-objects and meta-relationship instances. The slave model may then be communicated to the user so that the user has access to the data in the model using some appropriate user interface, such as in order to re-render FIG. 8b. Now, a method for updating a master meta-object in accordance with the invention will be described.

Figure 9:
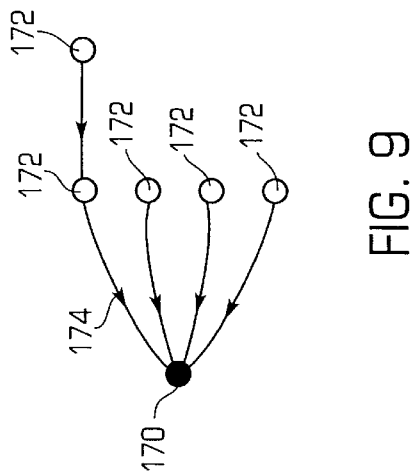
FIG. 9 is a diagram illustrating is master meta-object update in accordance with the invention.

FIG. 9 is a diagram illustrating a master replica update in accordance with the invention wherein when the master replicate [etc.] is updated by the authorized user, the updated value of that meta-object is propagated to all slave copies of the meta-object so that all of the users in the project that have access to that particular master meta-object through a slave meta-object receive that update and their respective slave copy of the meta-object is updated. In order to ensure the integrity of the data, only the owner of the master meta-object may change the value of an meta-object. However, as described below with reference to FIGS. 11 and 12, a slave meta-object may also be updated by transferring the lock associated with the master meta-object as will be described shortly to the current slave meta-object so that the slave meta-object becomes the master meta-object for purposes of the update in accordance with the invention.

Returning to FIG. 9, a master meta-object 170 is shown with one or more slave meta-objects 172 as it may be stored in any of the integration servers and/or clients or other servers that may track the slave meta-objects associated with each master meta-object. An attribute link 174 is associated with each master meta-object/slave meta-object pair wherein the attribute link points to the master meta-object. In particular, all of the attribute links 174 point towards the master link. This may also be referred to as the master lock since it ensures that only the master meta-object may be modified or updated to maintain integrity. In accordance with the invention, when the master meta-object 170 is updated or changed, the changes to the master meta-object are propagated to each slave meta-object 172 based on the links shown.

Replicas of meta-entity instances may also include a role player table (RPT) that capture some or all of the relations that exist in the meta-entity instance model between the meta-entity instance and the rest of the meta-entity instances in that model. An example of the RPT for the model shown in FIGS. 8A and 8B is provided below in tabular format.

TABLE 1

ROLE PLAYER TABLE

| Meta-Relationship | List |
|---|---|
| "Contains" | 1st Meta-Relationship instance = model to block1 |
|  | 2nd Meta-Relationship instance = model to block2 |
| "fulfills" | 1st Meta-Relationship instance = model to requirement |

In accordance with a preferred embodiment of the invention, the complete RPT may be moved along with the master lock so that the master replica knows of all meta-relationship instances in which it participates with any other meta-entity instance. If the meta-entity instance does not have a RPT, it is a replication (slave meta-entity instance). In accordance with another embodiment of the invention, the RPT may be more loosely coupled to the master lock and the full RPT may be distributed over several replicas of the same meta-entity instance, with the replicas participating in a best-effort synchronization protocol.

In terms of the updating of a meta-object, there may be three cases: 1) we create a new slave, so we need to get it the correct attribute values and RPT (if so desired, may be empty); 2) we update a master, so we need to forward all changes to all slaves (that may be delayed or queued); and 3) we update a slave, in which case we try to acquire the lock, and if we are successful, it becomes case 2 otherwise we just refuse to update the slave. Now, a method for creating a new slave (case 1) and updating a master meta-entity in accordance with the invention (case 2 above) will be described.

Figure 10:
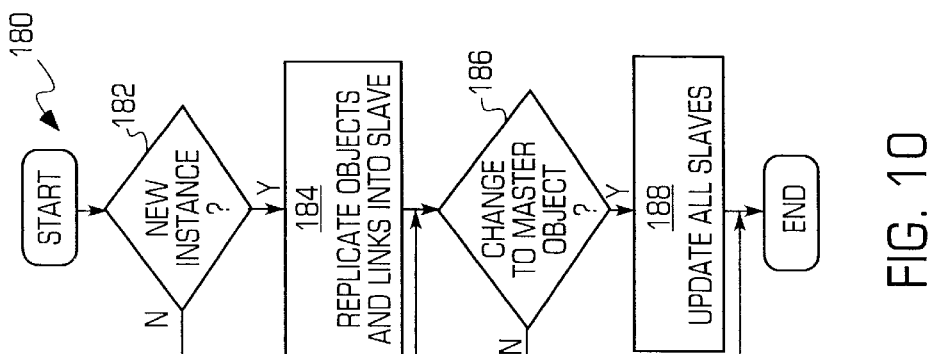
FIG. 10 is a flowchart illustrating a master meta-object update method in accordance with the invention.

FIG. 10 is a flowchart illustrating a new slave generation and master meta-object update method 180 in accordance with the invention. In step 182, the method may determine if there is a new instance of a slave meta-object and generate that new slave meta-object. If there is a new instance of a slave meta-object, then the master meta-object and the links are replicated (these may be empty). This completes the new slave generation process. Now, the master meta-object updating method will be described.

In step 186, the method periodically determines if there has been a change to the master meta-object. If there has been a change to the master meta-object, then the slave meta-objects associated with the master meta-object as shown in FIG. 9, may be updated. When updating the master meta-object, the master lock is maintained at the master meta-object to ensure that the slave meta-objects are not updated. Now, a method for updating a slave meta-object in accordance with the invention will be described.

Figure 11:
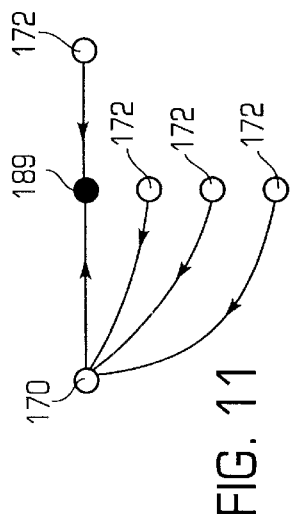
FIG. 11 is a diagram illustrating a slave meta-object update in accordance with the invention.
Figure 12:
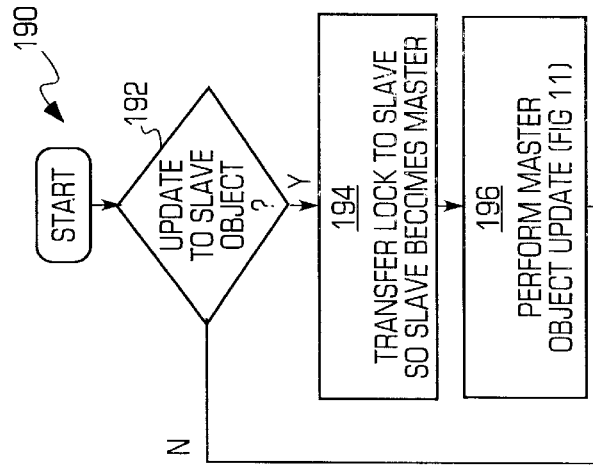
FIG. 12 is a diagram illustrating a method for slave meta-object updating in accordance with the invention.

FIG. 11 is a diagram illustrating a slave meta-object update in accordance with the invention and FIG. 12 is a diagram illustrating a method for slave meta-object updating in accordance with the invention. In accordance with the invention, the updating of the slave meta-object may only occur if the master lock is transferred to the slave meta-object to effectively make the slave meta-object the master for purposes of the update. In other words, during the update of the slave meta-object, no other slave meta-object or the master meta-object may change the values of the data to again ensure integrity of the data. If the slave meta-object cannot acquire the master lock, then the slave cannot update its value.

As shown in FIG. 11, the old master meta-object 170 has become a slave meta-object for purposes of the update and the slave meta-object being updated 189 becomes the master meta-object. In accordance with the invention, the attribute links 174 are also changed so that the links adjacent the new master meta-object 174 point towards that meta-object. Once the update has been completed, the master lock may or may not be returned to the old master meta-object 170.

Thus, in a slave update method 190, and in step 192, in particular, the method periodically determines if a slave meta-object has obtained the master lock and if that slave that has obtained the master lock has an update. The transfer of the master lock effectively makes it so that the particular slave meta-object becomes the master for purposes of the update. Thus, during any update, (and that is the same for any other time) there is only one master replica for any given meta-object or meta-relationship instance. In step 196, the new master meta-object is updated as shown in FIG. 11 and the master lock may or may not be returned to the previous master meta-object. Now, an example of the operation of the program data management system in accordance with the invention will be described.

Figure 13:
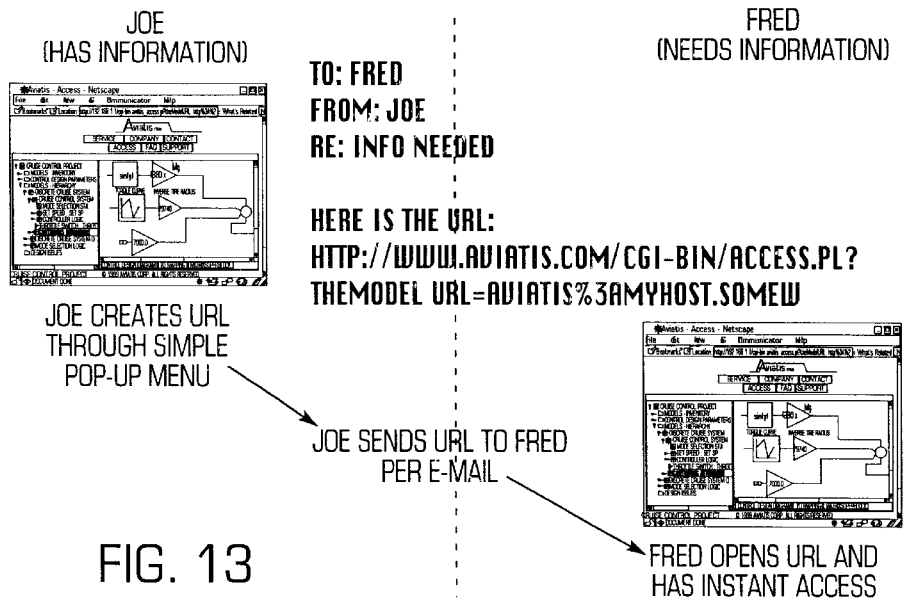
FIG. 13 is a diagram illustrating two users using the project data management system in accordance with the invention.

FIG. 13 is a diagram illustrating two users using the project data management system in accordance with the invention. In particular, an engineer Joe (from FIG. 6) has some information that engineer Fred needs to review in order to complete a task of the project. In accordance with the invention, Joe creates a universal resource locator (URL by querying the project data management system (such as through an appropriate user element such as a pop-up menu) and forwards the URL to Fred by any means of communication, such as e-mail as shown in FIG. 13. Fred may then select the URL from the e-mail, open it in his web browser or other client and access the needed data without a meeting or telephone conference with Joe.

Figure 14:
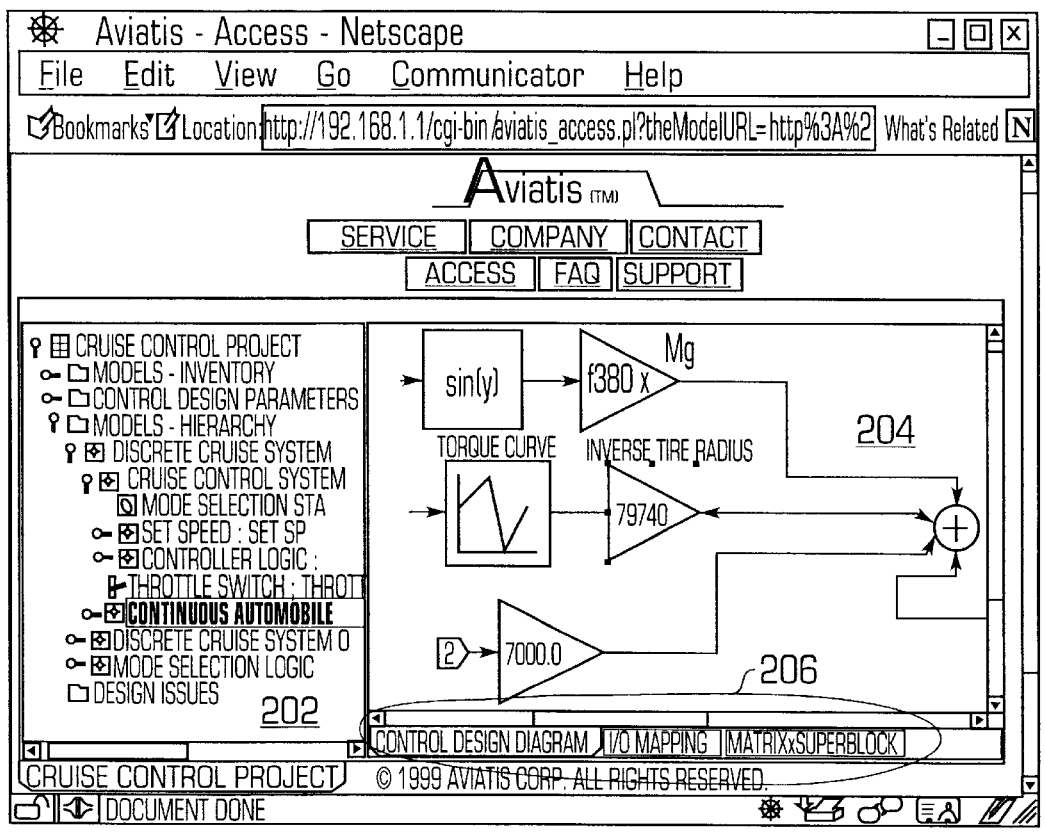
FIG. 14 is a diagram illustrating an example of a user interface for an engineer accessing the design model for a project using a web browser in accordance with a preferred embodiment of the invention.

FIG. 14 is a diagram illustrating an example of a user interface 200 for an engineer accessing information managed by an embodiment of the invention for a project using a web browser in accordance with a preferred embodiment of the invention. The user interface may be web page generated by the project data management system, including one or more Java applets or other types of content, that is displayed on a web browser software application of the user. In this example, a control design model accessed through an XML-based interface to a commercial control design modeling tool is shown displayed on the web page. The user interface 200 that may be accessed by a particular URL may include an meta-object hierarchy section 202 and a display portion 204. The hierarchy section 202 may show (but is not limited to) the outline of the meta-objects in the model. When a user selects a particular meta-object in the hierarchy section 202, that meta-object is displayed in the display section 204, such as the flow diagram shown. For each meta-object, the display section 204 may also include one or more tabs 206 indicating other diagrams, dialogs, forms or other user interface elements associated with the particular selected meta-object. Thus, using the interface, a user associated with the project is able to access the data from the project 1) without being able to use the actual tool that created the data; and 2) without being at the same location as the tool or the data.

In a preferred embodiment, a user may access a website, such as http://www.aviatis.com. After an authentication step (name and password being entered), the user may enter a URL that directs the browser to the source of the engineering information, such as a model in a modeling tool. Once the URL is entered, the engineering information is displayed in the browser as a web page as shown in FIG. 14. In the example shown in FIG. 14, a URL was accessed that references a cruise control project that consists of a catalog of models and parameters generated by a control design tool. The user may then interact with the model that has been displayed, such as browsing through it, inspect a parameter and the like. The interaction between the user and the displayed information may not be limited to being read-only, in which case the updated information is written back through the enabler into the original data source (such as by updating the file or database from which the information was read). The interaction with the model is possible in accordance with the invention because the model is rendered by a Java applet that "understand" the contents of what it is displaying. In the example, the user has selected a specific MATRIXx™ SuperBlock™ (Wind River Systems) in the left window pane (the index portion 202) which is then displayed in the right window pane in more detail. The display portion 204 permits the user to interact with the model, such as selecting a particular block (a gain block in the example), as if the user was actually using the tool used to generate the information. A pop-up menu (not shown in FIG. 14) may provide context-sensitive operations, such as the ability to copy the block's URL to the clipboard As with typical web pages, the web page shown including the applets on the page may include context-sensitive hotlinks to frequently asked questions and support.

By entering a different URL corresponding to a different piece of information, the user may browse and access other parts of the current development project. For example, if Jim wants to see Fred's latest models, Jim may enter a URL identifying Fred's models into the browser application and Jim now has access to the relevant information. In the example shown in FIG. 6, the engineers from both Company A and Company B (Fred and Jim) may need parameter information from Joe. With the project data management system in accordance with the invention, Joe may send the other engineers a URL pointing to the relevant parameter, such as by using e-mail, so that the engineers can access the parameter information, in context, directly from their browser applications. An example of what the engineers may see when viewing the parameter information is shown in FIGS. 15 and 16.

Figure 15:
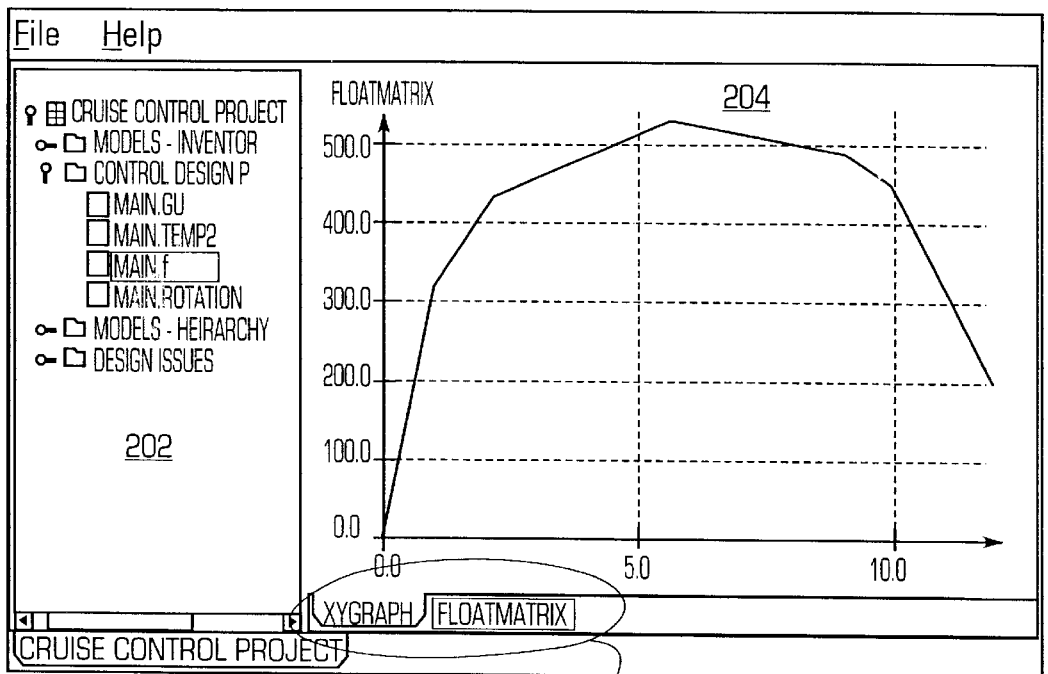
FIG. 15 is a diagram illustrating an example of a user interface for a user browsing a remote parameter in graphical form using the system in accordance with the invention.
Figure 16:
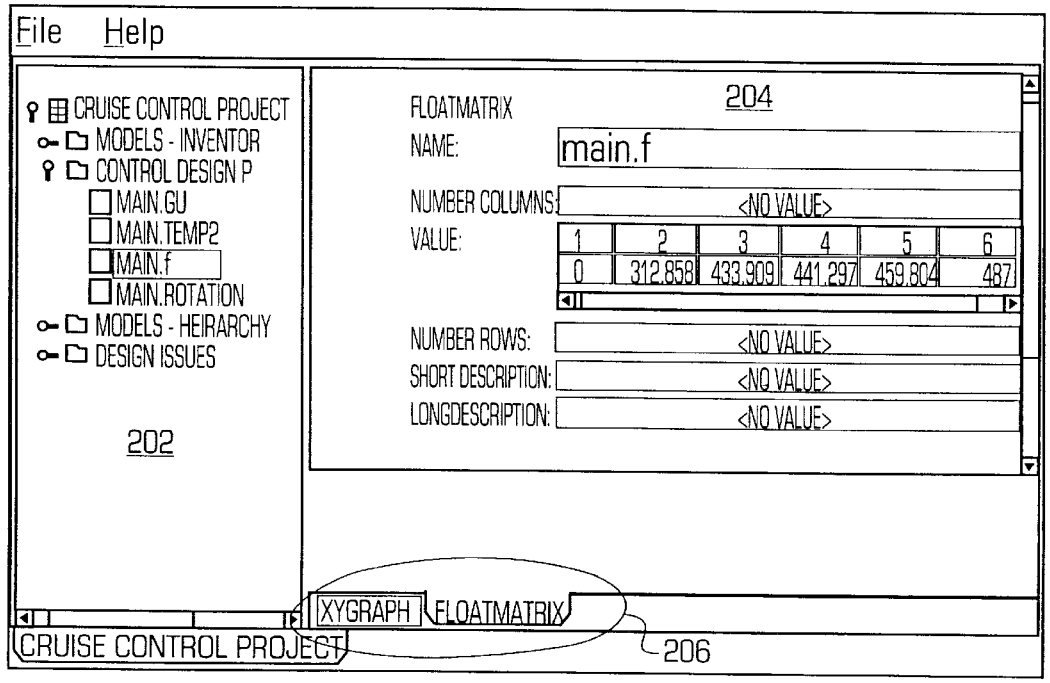
FIG. 16 is a diagram illustrating an example of a user interface for a user browsing a remote parameter in tabular form using the system in accordance with the invention.

As shown in FIGS. 15 and 16, the engineer may see different information depending on which portion of the parameter is selected by the user. In both figures, the user has selected the main.f element from the index portion 202. In this example, main.f has an XYGraph element, known as a Viewlet, and a FloatMatrix associated with it as shown by the tabs 206. In FIG. 15, the user selects the XYGraph tab and the display portion 204 displays a graph illustrating the values of the parameter for different input values. In FIG. 16, the user selects the FloatMatrix tab and the display portion 204 displays a graphical table illustrating the values of the parameter for different input values.

Figure 17:
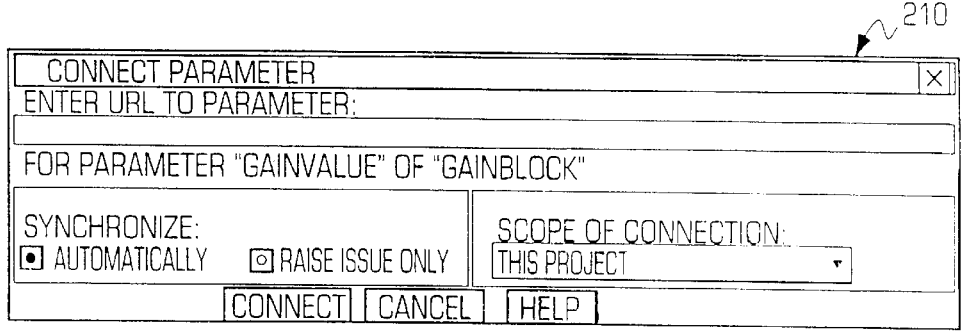
FIG. 17 is a diagram illustrating an example of a user interface that permits a user to link two parameters across organizational and tool boundaries in accordance with the invention.

Beyond the ability to browse the current value of the information, a user may also use the project data management system to generate a "hotlink" (a meta-relationship instance) between their own engineering information and the information that is depends on from other engineering groups. Although similar to typical web hotlinks, the hotlinks in accordance with the invention are bi-directional and have full semantic relationships, implemented using the RolePlayerTable and related concents discussed above. This means that the project data management system understands the meaning of the hotlink and actively manages the relationship. As an example, Jim may use the model displayed in the browser to pop up a dialog box 210 (as shown in FIG. 17) that allows him to relate the parameter of the gain block in his model, for example, to the parameter in Joe's database (See FIG. 6). The text input line shown in FIG. 17 permits the URL of the parameter to be entered into the system. The dialog box may permit the user to specify if the project data management system should keep the hotlinked parameter synchronized between Joe's database and Jim's control design tool so that the project data management system may automatically modify Joe or Jim's data (see the updating method described above) whenever the other engineer makes a change to the shared parameter.

Figure 18:
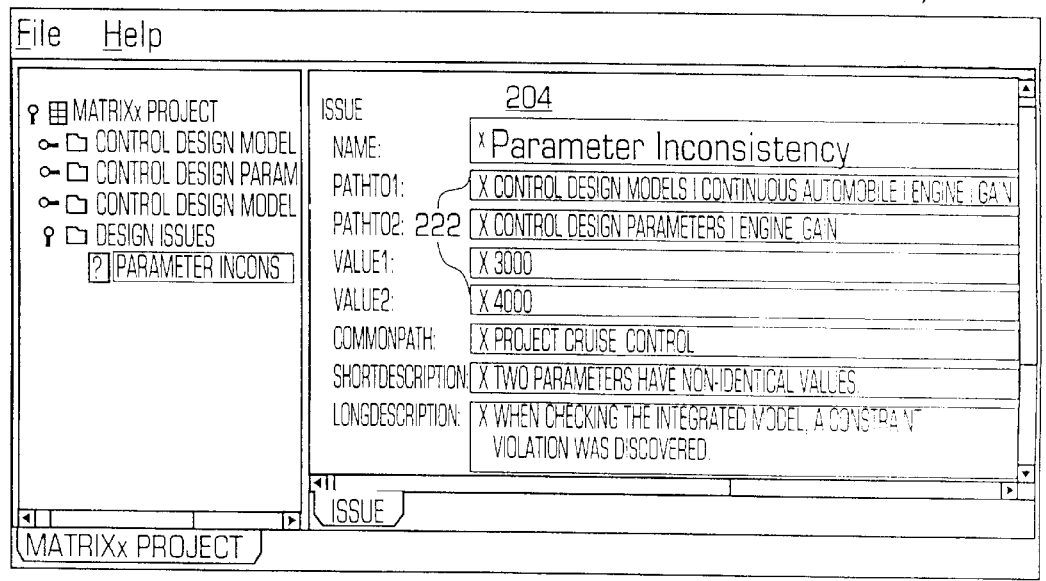
FIG. 18 is a diagram illustrating an example of a user interface of the system for displaying a parameter inconsistency.

Alternatively, Jim may have the project data management system list an inconsistency as a "known issue" in the browser web page so that the engineers who rely on that parameter are aware of the change and can take appropriate corrective action. An example of a known issue user interface 220 in accordance with the invention is shown in FIG. 18 wherein the known issue may be displayed in the display portion 204 of the browser page. As shown in FIG. 18, the known issue interface may include information about the parameter or value that is inconsistent, the two different inconsistent values and a brief description of the inconsistency found by the project data management system. In accordance with the invention, the known issue user interface automatically appears when the project data management system locates an inconsistency in an meta-object or model and then also automatically disappears whenever the issue is resolved. Thus, even if the system does not change the values for each user, it automatically alerts each user to the problem until the problem is resolved so that the user is constantly reminded that there is an inconsistency in the information.

In accordance with the invention, the project management system may be used for a variety of different projects and with different types of data. Thus, the system in accordance with the invention provides a generic mechanism for connecting anything to anything as long as there is a semantic relationship (a meta-relationship) between them, according to the meta-model. Similarly, the system provides a generic constraint mechanism that can be applied on anything, and only needs to be instantiated with a particular constraint.

Figure 19:
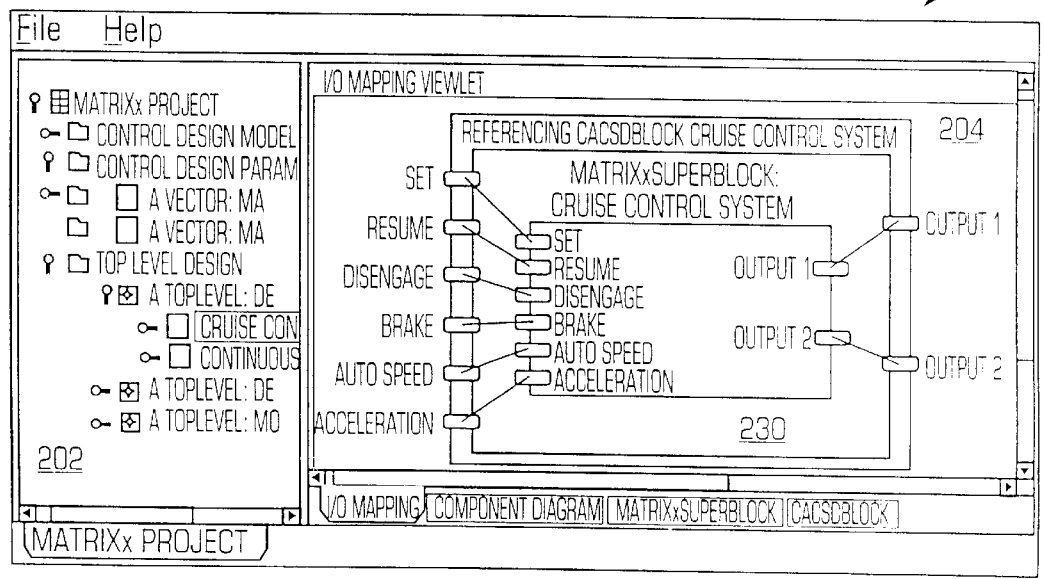
FIG. 19 is a diagram illustrating an example of a user interface for virtually connecting two distributed control design models in accordance with the invention.

FIG. 19 is a diagram illustrating an example of a user interface 230 for virtually connecting to distributed control design models in accordance with the invention. In the example with Jim, Joe and Fred, Fred and Jim may share a common interface between their respective control design models. To facilitate their interaction, Jim may connect the two sub-models (his and Fred's model) right from within the browser to reflect that Fred implements a sub-model of Jim's model. Although the connection appears to be exist in both browsers, it is a virtual connection in that data is not exchanged between the modeling tools of Jim and Fred. FIG. 19 illustrates a user interface 230 for virtually connecting two models in accordance with the invention.

As described above, traditional communication and collaboration approaches for engineers are becoming increasingly inadequate for the development of tomorrow's products. This is especially true for product development projects facing increasing time-to-market and cost pressures that are being developed using distributed engineering teams. The project data management system in accordance with the invention enables every authorized project participant with a web browser to access to all relevant engineering content for the project regardless of the location of the information or the user or of what type of tool was used to create the content. The system also permits users to relate information items together in order to indicate the relationships between the various product components as well as between distributed items in different locations, tools etc. The system also ensures that the content's value are kept consistent and ensures that each user that is affected by an inconsistent content is notified of the inconsistency.

In summary, the project data management system in accordance with the invention may be used for accessing, integrating and monitoring various types of information or data for any project wherein the project participants may be distributed. An example of the system and its operation for an engineering project are described above, but the system has a much broader applicability to any project that requires distributed data to be accessed, integrated or monitored.

While the foregoing has been with reference to a particular embodiment of the invention and with reference to a particular example of the system, it will be appreciated by those skilled in the art that changes in this embodiment may be made without departing from the principles and spirit of the invention, the scope of which is defined by the appended claims.

What is claimed is:

1. A project data management system, comprising:

an integration server for storing one or more master meta-objects and one or more slave meta-objects, the master meta-objects being originated at the integration server and the slave meta-objects being originated at a remote site;

one or more clients for accessing the master and slave meta-objects stored on the integration server;

one or more enablers in the integration server, each enabler associated with each tool that is used to generate information stored as a collection of related meta-objects in the integration server, the enablers permitting the information represented as the meta-objects to be accessed by a user without accessing the particular tool; and one or more differencers in the integration server for comparing the values of the meta-objects being accessed by the user at predetermined time periods in order to determine if the particular meta-object has been changed and for updating the values associated with the meta-object when a change has occurred.

2. The system of claim 1, wherein the client comprises a browser software application executed by a computer that accesses the master and slave meta-objects stored in the integration server.

3. The system of claim 2, wherein the browser application comprising means for downloading web pages from the integration server containing the master and slave meta-objects.

4. The system of claim 2, wherein the browser application comprises means for downloading java applets from the integration server containing the master and slave meta-objects.

5. The system of claim 1 further comprises one or more additional integration servers each connected to the integration server, each additional integration server storing master meta-objects generated by user connected to the integration server and slave meta-objects requested by user of the integration server that are not stored on the integration server, each integration server further comprising means for receiving a request for a master meta-object from another user connected to another integration server, means for replicating the master meta-object to generate a slave meta-object and means for communicating the slave meta-object to the other integration server.

6. The system of claim 5, wherein the master and slave meta-objects are engineering data.

7. The system of claim 5, wherein the differencer in each integration server further comprises means for communicating the changes in the master meta-object to other integration servers whose users are linked to the particular master meta-object.

8. The system of claim 7, wherein each master meta-object on each integration server comprises a master lock to ensure that the slave meta-objects associated with the master meta-object are not updated or modified.

9. The system of claim 7, wherein each integration server further comprises means for receiving a user request to update a slave meta-object, means for requesting a transfer of the master lock to the slave meta-object, and means for updating the slave meta-object if the master lock is transferred to the slave meta-object.

10. The system of claim 5, wherein each integration server further comprises means for generating a link between two meta-objects so that updates to one meta-objects are made to the other meta-objects.

11. A project data management system, comprising:
a first integration server storing one or more master meta-objects relating to data associated with the project, the master meta-objects being generated by one or more different tools;
one or more second integration servers connected to the first integration server, the other integration servers storing one or more master meta-objects and one or more slave meta-objects, the master meta-objects being generated by users connected to the second integration servers and the slave meta-objects being generated by a user connected to the first integration server; and
the first and second integration servers each further comprising means for receiving a user request to access a meta-object not located on the server, means for requesting a replicated meta-object from the server that stores the master meta-object and means for receiving a replicated meta-object so that the user may access the meta-object.

12. The system of claim 11, wherein the first and second integration servers further comprise one or more enablers in the integration server, each enabler associated with each tool that is used to generate information stored as a collection of related meta-objects in the integration server, the enablers permitting the information represented as meta-objects to be accessed by a user without accessing the particular tool.

13. The system of claim 11, wherein the first and second integration servers further comprise one or more differencers in the integration server for comparing the values of the meta-objects being accessed by the user at predetermined time periods in order to determine if the particular meta-object has been changed and for updating the values associated with the meta-object when a change has occurred.

14. The system of claim 11 further comprising one or more clients connected to a particular integration server for accessing the meta-objects stored on the particular integration server and the other integration servers.

15. The system of claim 14, wherein each client further comprises a browser software application executed by a computer that accesses the master and slave meta-objects stored in the integration server.

16. The system of claim 15, wherein the browser application comprising means for downloading web pages from the integration server containing the master and slave meta-objects.

17. The system of claim 15, wherein the browser application comprises means for downloading java applets from the integration server containing the master and slave meta-objects.

18. The system of claim 15, wherein the master and slave meta-objects are engineering data.

19. The system of claim 13, wherein the differencer in each integration server further comprises means for communicating the changes in the master meta-object to other integration servers whose users are linked to the particular master meta-object.

20. The system of claim 19, wherein each master meta-object on each integration server comprises a master lock to ensure that the slave meta-objects associated with the master meta-object are not updated or modified.

21. The system of claim 19, wherein each integration server further comprises means for receiving a user request to update a slave meta-object, means for requesting a transfer of the master lock to the slave meta-object, and means for updating the slave meta-object if the master lock is transferred to the slave meta-object.

22. The system of claim 11, wherein each integration server further comprises means for generating a link between two meta-objects so that updates to one meta-objects are made to the other meta-objects.

23. A project data management method, comprising:
storing one or more master meta-objects relating to data associated with the project on a first integration server, the master meta-objects being generated by one or more different tools;
connecting one or more second integration servers to the first integration server, the other integration servers storing one or more master meta-objects and one or more slave meta-objects, the master meta-objects being generated by users connected to the second integration servers and the slave meta-entity instances being generated by a user connected to the first integration server;
receiving a user request to access a meta-object not located on the server;
requesting a replicated meta-object from the server that stores the master meta-object; and
receiving a replicated meta-object so that the user may access the meta-object.

24. The method of claim 23 further comprising accessing the meta-objects stored in the integration server using an enabler, each enabler associated with each tool that is used to generate information stored in the integration server and the enablers permitting the information in the meta-object to be accessed by a user without accessing the particular tool.

25. The method of claim 23 further comprising comparing the values of the meta-objects being accessed by the user at predetermined time periods in order to determine if the particular meta-object has been changed and updating the values associated with the meta-object when a change has occurred.

26. The method of claim 23 further comprising using a client connected to a particular integration server for accessing the meta-objects stored on the particular integration server and the other integration servers.

27. The method of claim 26 further comprising using a browser software application that accesses the master and slave meta-objects stored in the integration server.

28. The method of claim 27, wherein using the browser application comprising downloading web pages from the integration server containing the master and slave meta-objects.

29. The method of claim 27, wherein using the browser application comprises downloading java applets from the integration server containing the master and slave meta-objects.

30. The method of claim 27, wherein the master and slave meta-objects are engineering data.

31. The method of claim 25, wherein updating the values further comprise communicating the changes in the master meta-object to other integration servers whose users are linked to the particular master meta-object.

32. The method of claim 31 further comprising receiving a user request to update a slave meta-object, requesting a transfer of the master lock to the slave meta-object, and updating the slave meta-object if the master lock is transferred to the slave meta-object.

33. The method of claim 23 further comprising generating a link between two meta-objects so that updates to one meta-objects are made to the other meta-objects.

34. A method for updating a meta-object stored in a distributed project data management system having one or more integration servers, comprising:

receiving a request to update a meta-object for a particular integration server, the meta-objects including a master meta-object stored on the particular integration, each master meta-object having one or more associated slave meta-objects;

determining that the master lock is located at the master meta-object;

updating the master meta-object; and propigating the updates to the master meta-object to the slave meta-objects associated with the master meta-object.

35. The method of claim 34, wherein updating further comprises determining if an update for a slave meta-object is requested, requesting a transfer of the master lock from the associated master meta-object to the slave meta-object to be updated and updating the slave meta-object if the master lock is transferred to the slave meta-object.

* * * * *